UNITED STATES PATENT OFFICE.

ALFRED GRESSLY, OF FRANKFORT-ON-THE-MAIN, GERMANY, ASSIGNOR TO CASSELLA COLOR COMPANY, OF NEW YORK, N. Y.

ORANGE OR BROWN DYE AND PROCESS OF MAKING SAME.

No. 903,284.  Specification of Letters Patent.  Patented Nov. 10, 1908.

Application filed June 9, 1908. Serial No. 437,511.

*To all whom it may concern:*

Be it known that I, ALFRED GRESSLY, a citizen of Switzerland, and residing at Frankfort-on-the-Main, in the Province of Hesse-Nassau, Kingdom of Prussia, German Empire, (whose post-office address is No. 1 Eschersheimer Landstrasse, Frankfort-on-the-Maine, Germany,) have invented some new and useful Improvements in the Manufacture of Orange or Brown Coloring-Matters, of which the following is a full description.

I have discovered that by allowing dinitrostilbenedisulfo acid to act in alkaline solution on the sulfo acids of amidoazo compounds valuable dyestuffs are obtained, which are distinguished by their remarkable affinity to cotton fiber as well as by their excellent fastness. The shades vary from orange and orange-red to brown according to the materials employed, but the duration and temperature of the operation also influence the depth of the shade. The process is illustrated by the following examples:

Example I. 47, 4 kilos dinitrostilbenedisulfonate of soda are dissolved with 32.7 kilos sulfanilicacid-azo-alphanaphthylamin in 500 liters water and 50 kilos caustic soda lye of 40° Baumé and heated to boiling temperature for 3 to 4 hours. The solution is neutralized with mineral acid and the dyestuff precipitated with salt. It dyes cotton an orange-red shade.

Example II. If in the place of sulfanilic-acid-azo-naphthylamin in Example I 32.7 kilos benzol-azo-alphanaphthylamin-sulfo acid Clevé are used, the conditions being otherwise the same, an orange-red dyestuff is obtained.

Example III. By using 32.1 kilos metanilic-acid-azo-m-amido-p-cresolether in place of the sulfanilic-acid-azo-alphanaphthylamin applied in Example I, the other conditions being the same, a dyestuff is obtained after 2 to 3 hours' heating to the boil, which dyes cotton orange.

In these examples the dinitrostilbenedisulfo acid may be replaced by the dinitrodibenzyldisulfo acid, without any essential change of the result.

Having now described the nature of my invention and in what manner it may be carried out, what I claim is—

1. The process of producing orange, orange-red or brown coloring matters by allowing dinitrostilbenedisulfo acid to act in alkaline solution on amidoazosulfo acids, substantially as described.

2. The new products or coloring matters which are produced by the condensation of dinitrostilbenedisulfo acid and amidoazo sulfo acids, which are easily soluble in water with an orange color, nearly insoluble in alcohol, soluble in strong sulfuric acid with a bluish black shade, being precipitated in form of brown flakes from such a solution by addition of water and dyeing unmordanted cotton orange to orange-red or brown shades, substantially as described.

In witness whereof I have hereunto signed my name this 18th day of May 1908, in the presence of two subscribing witnesses.

ALFRED GRESSLY.

Witnesses:
 JEAN GRUND,
 CARL GRUND.